United States Patent [19]
Makujina

[11] Patent Number: 5,865,890
[45] Date of Patent: Feb. 2, 1999

[54] BATTER RECLAIMER SYSTEM

[75] Inventor: Nosh R. Makujina, Boise, Iowa

[73] Assignee: J. R. Simplot Company a Nevada corporation

[21] Appl. No.: 971,474

[22] Filed: Nov. 15, 1997

[51] Int. Cl.[6] .............................. A01J 27/02; A23G 3/24; B05C 11/11; A23B 1/10
[52] U.S. Cl. ................................ 118/13; 118/26; 118/31; 426/289; 426/296; 426/438
[58] Field of Search .................................. 118/13, 16, 17, 118/18, 19, 20, 22, 27, 29, 31, 600, 602, 612; 426/87, 94, 289, 296, 302, 438

[56] References Cited

U.S. PATENT DOCUMENTS

| | | | |
|---|---|---|---|
| 2,028,435 | 1/1936 | Burns | 118/31 |
| 2,522,847 | 9/1950 | Stiles | 91/2 |
| 2,655,127 | 10/1953 | Hice et al. | 118/30 |
| 3,858,546 | 1/1975 | Benson et al. | 118/16 |
| 4,058,083 | 11/1977 | Miller | 118/16 |
| 5,056,455 | 10/1991 | Ritz | 118/17 |
| 5,238,493 | 8/1993 | Miller | 118/16 |

*Primary Examiner*—David A. Simmons
*Assistant Examiner*—J. A. Lorengo
*Attorney, Agent, or Firm*—Kelly Bauersfeld Lowry & Kelley, LLP.

[57] ABSTRACT

A reclaimer system is provided for collecting and recycling a viscous coating batter in a foods processing line, particularly such as in a production line for making batter coated French fry potato strips. The reclaimer system comprises an elongated collection trough mounted at the downstream end of a product conveyor used to transport batter coated food products to a fryer, wherein the conveyor is positioned to collect excess batter dripping from the conveyor and the food products and further wherein this excess batter would otherwise undesirably fall into the fryer. A paddle is reciprocated back and forth within the trough to sweep collected batter therein from opposite open ends of the trough into appropriate collection vessels or funnels for recycling. The trough is water cooled to prevent significant cooking of the batter therein, and the paddle includes a central overflow port to permit large quantities of batter to spill therethrough without being swept over the longitudinal edges of the trough.

16 Claims, 3 Drawing Sheets

BATTER RECLAIMER SYSTEM

BACKGROUND OF THE INVENTION

This invention relates generally to an improved system for reclaiming and recycling excess viscous batter in a foods processing line for producing batter coated food products such as batter coated French fry potato strips and the like. More particularly, this invention relates to a batter reclaimer system designed to collect and recycle excess batter dripping from the food products as those food products are delivered to a cooking vessel such as a fryer, wherein the batter is collected and recycled substantially without cooking thereof.

Batter coated food products are generally known in the art and have enjoyed increasing consumer popularity in recent years. For example, in one common form, a selected food product such as French fry potato strips is subjected to a batter coating step by immersion or spraying to encase or enrobe the food product within a liquid albeit relatively viscous batter containing a desired blend of ingredients such as flavorings and seasonings and the like. The batter coated food products are then transported typically on a porous mesh conveyor to a cooking vessel such as a fryer for at least partially cooking the products prior to further processing steps such as freezing and final packaging. The cooking step, especially in the case of a fryer for parfrying batter coated French fried potatoes, solidifies and sets the batter adhering onto the external surfaces of the food products. The batter coating thus remains on the products at the time of reheating and/or finish cooking immediately prior to consumption.

During the production of batter coated food products as described above, significant excess quantities of the liquid-based batter tends to drip or fall from the products particularly during transport thereof from a batter coating station to the cooking vessel. In this regard, a drip tray is commonly positioned beneath the transport conveyor to catch this excess batter and thereby permit convenient and economical recycling thereof to the batter coating station. However, it has been difficult or impractical to position this drip tray for effective collection of batter at the downstream end of the transport conveyor, or otherwise to catch batter dripping from the products as they are delivered from the conveyor into the cooking vessel such as a fryer containing hot cooking oil. Excess batter at this location has in general been allowed to enter the fryer where it is cooked to form solid crumbs which contaminates the cooking oil and also absorbs oil to result in overall increased oil usage and cost. Periodic screen-off removal of the batter crumbs has been required to prevent undesirable accumulation thereof. Efforts to collect excess batter at the downstream end of the conveyor have not avoided exposure of the batter to the heat of the fryer, resulting in at least partial batter cooking which renders any collected batter unsuitable for recycling.

There exists, therefore, a need for further improvements in and to systems and devices for reclaiming excess liquid-based batter in a foods processing line, particularly with respect to collecting excess batter at the point of delivery of batter coated food products into a cooking vessel such as a fryer, while preserving the collected batter substantially without cooking thereof to permit optimum and efficient recycling to a batter coating station. The present invention fulfills these needs and provides further related advantages.

SUMMARY OF THE INVENTION

In accordance with the invention, an improved batter reclaimer system is provided for collecting and recycling excess liquid-based batter in a foods processing line, particularly with respect to reclaiming excess batter at the downstream end of a product conveyor used to deliver batter coated food products such as French fry potato strips to a cooking vessel such as a fryer. The reclaimer system comprises an open-ended collection trough mounted at the downstream end of the conveyor in a position to catch excess batter dripping from the food products as well as excess batter from the conveyor, in combination with a reciprocal paddle disposed within the trough for sweeping collected batter into appropriate collection vessels or funnels for recycling to a batter coating station. The collection trough is water cooled to substantially prevent significant cooking of the reclaimed batter.

The reclaimer trough comprises an upwardly open receiver mounted generally at and slightly below the downstream end of the product conveyor, to extend transversely across a product flow path to catch excess batter as the coated products are delivered from the conveyor into the fryer. The reciprocal paddle is mounted within the trough for back and forth motion, preferably by means of a suitable linear actuator, to sweep accumulated batter out of the open trough ends into the collection vessels. The trough includes a water jacket defining a circulatory flow path for flow of cooling water therethrough to maintain the collected batter therein at or below a selected temperature to prevent significant cooking of the batter as a result of exposure to heat from the adjacent fryer. In addition, the paddle has an overflow or spillover port formed generally centrally therein to permit a portion of a large quantity of batter within the trough to pass through the overflow port and remain within the trough, without forcing the accumulated batter to spill over the longitudinal edges of the trough.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
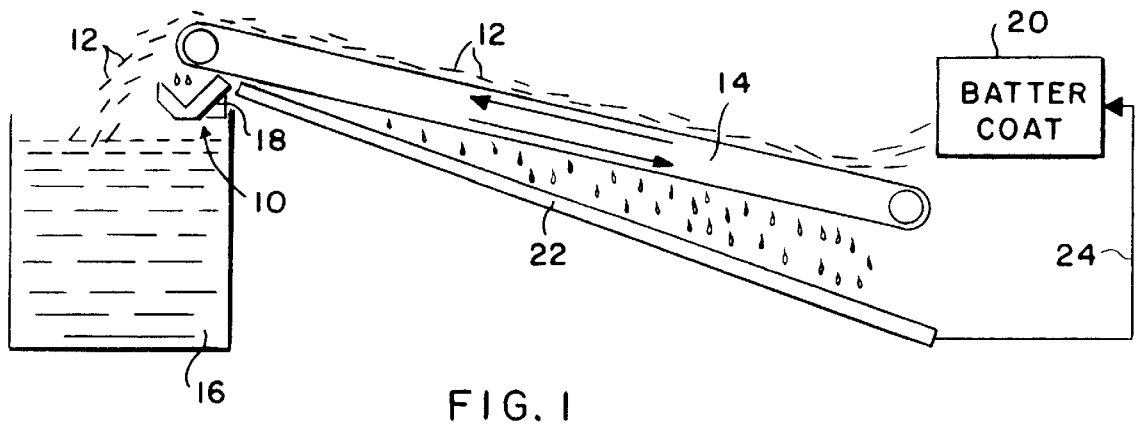
FIG. 1 is a schematic diagram depicting the batter reclaimer system embodying the novel features of the invention, and illustrating in side elevation a product conveyor for the delivery of a batter coated food product such as French fry potato strips to a cooking vessel such as a hot oil fryer.

As shown in the exemplary drawings, a batter reclaimer system referred to generally in FIG. 1 by the reference numeral 10 is provided for collecting and recycling liquid-based batter in a food processing line. The reclaimer system 10 is shown for use in a production line for making batter coated products 12 such as French fry potato strips which are suitably coated with the batter and then delivered via a product conveyor 14 to a cooking vessel 16 such as a hot oil fryer wherein the potato strips are at least partially cooked to set and adhere the batter to the external surfaces of the strips. The reclaimer system 10 comprises an open-ended collection trough 18 mounted at a downstream end of the conveyor 14 to collect excess batter dripping from the conveyor and the potato strips 12, and to recirculate or recycle the collected batter substantially without cooking thereof.

FIG. 1 illustrates in schematic form the product conveyor 14 for transporting food products such as French fry potato strips 12 from a batter coating station 20 to the fryer 16. In this regard, the batter coating station 20 includes means known in the art for applying the liquid-based batter to encase or enrobe the strips 12 by immersion or spraying, wherein the batter comprises a relatively viscous blend of ingredients such as flavoring and seasonings and the like. Excess batter tends to drip from the strips 12 as they are transported by the conveyor 14. A drip tray 22 is normally mounted beneath the conveyor 14 to collect such excess batter for recycling via a conduit 24 or the like to the batter coating station 20. The conveyor 14 is typically constructed with an open mesh transport belt or the like to allow the excess batter to drip into the underlying tray 22.

At a downstream end of the product conveyor 14, the batter coated strips 12 are delivered into the open upper end of the fryer 16 for parfrying. This parfrying step partially cooks the strips 12 while additionally cooking and setting the batter on the external strip surfaces. However, additional excess batter tends to drip from the strips as well as from the downstream end of the conveyor 14, to fall into the fryer. It is desirable to minimize the amount of free batter entering the fryer, since this batter results in undesirable cooked batter crumbs in the finished product and also tends to absorb oil to result in increased overall oil usage. The batter reclaimer system 10 of the present invention is designed to capture and collect excess batter at the downstream end of the conveyor in a manner which substantially prevents cooking of this collected batter so that it can be recycled to the batter coating station 20 for re-use.

Figure 2:
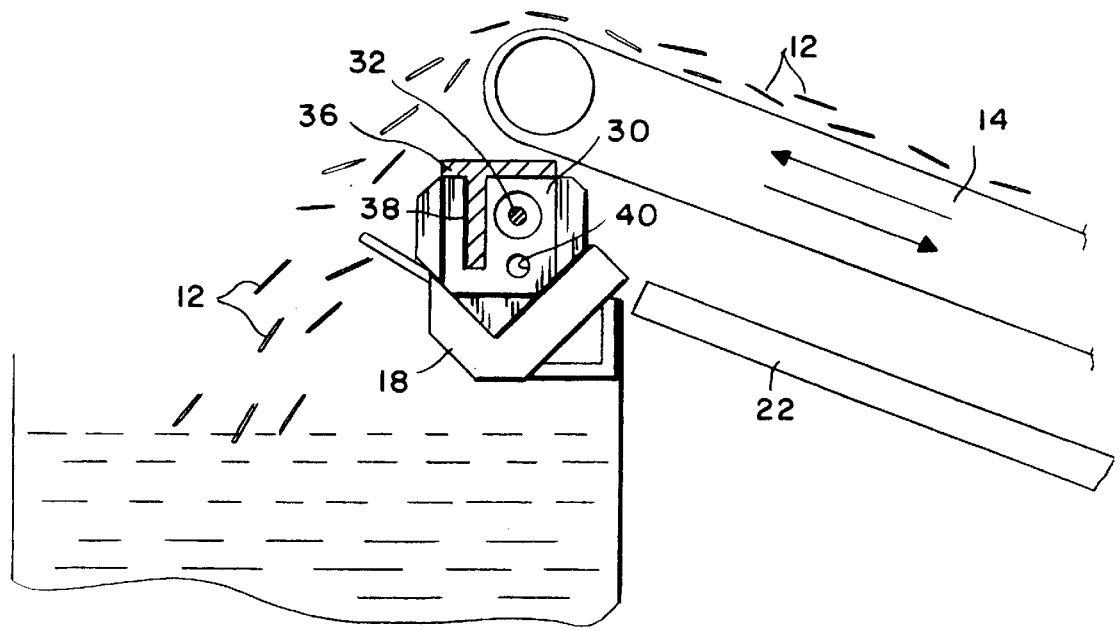
FIG. 2 is an enlarged fragmented side elevation view depicting a portion of the batter reclaimer system shown in FIG. 1.
Figure 3:
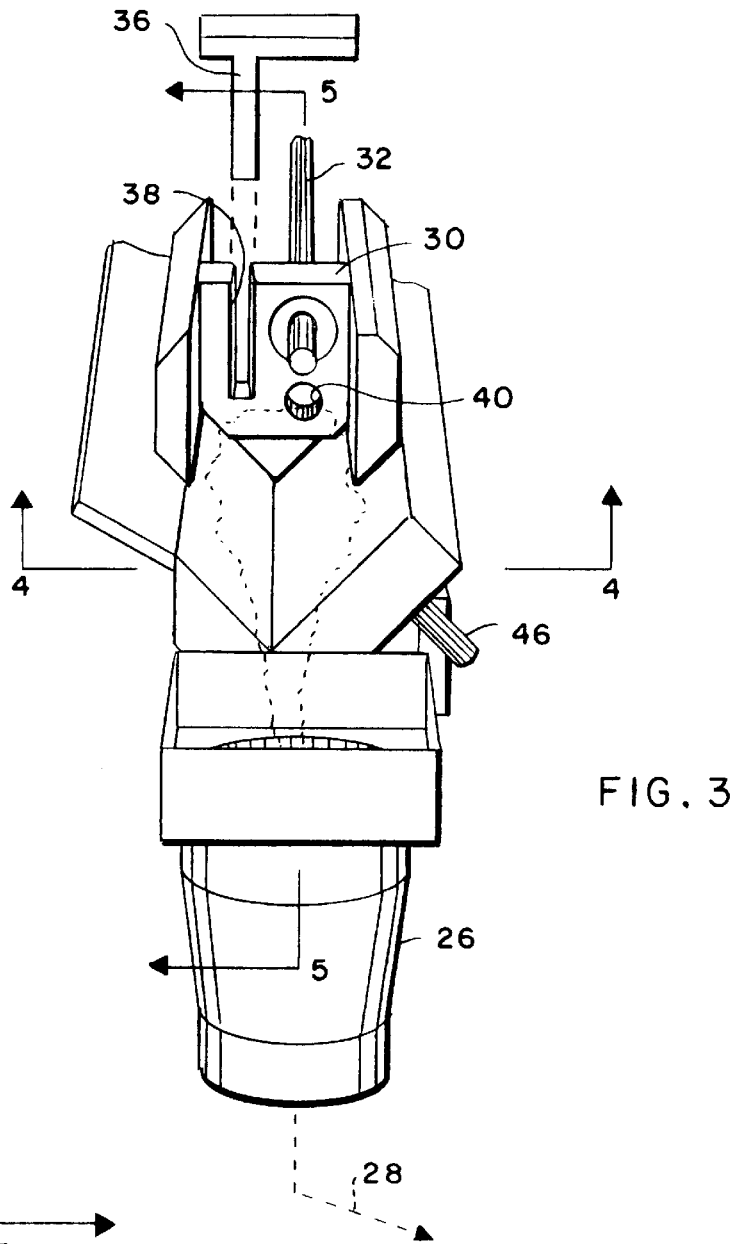
FIG. 3 is a further enlarged and fragmented perspective view showing a portion of the batter reclaimer system.

As shown in FIGS. 1–3, the batter reclaimer system 10 comprises the collection trough 18 mounted below and extending laterally across the downstream end of the conveyor 14 in a position to catch excess batter dripping therefrom. The preferred trough has a generally V-shaped upwardly open profile for direct reception of the excess batter, and open opposite ends for delivery of the excess batter into a pair of collection vessels 26 such as funnels (FIG. 3) for batter flow through appropriate conduits 28 to the drip tray 22 or other suitable recycling point.

Figure 5:
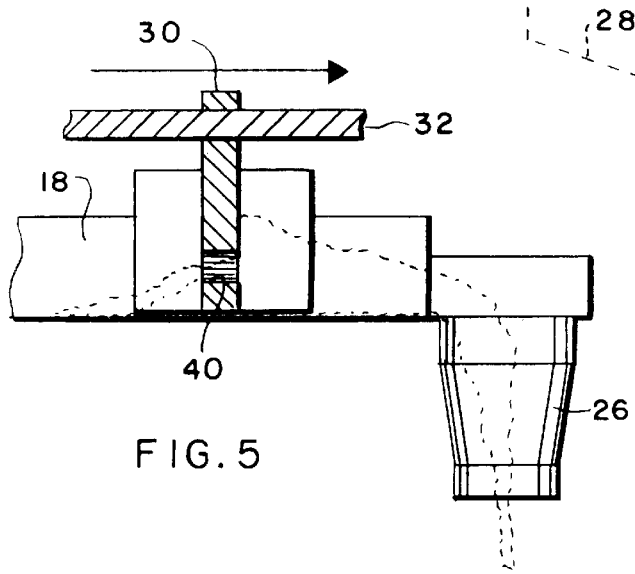
FIG. 5 is a fragmented transverse vertical sectional view taken generally on the line 5—5 of FIG. 3.

A reciprocal paddle 30 is mounted within the trough 18 and operated by a suitable drive means to sweep back and forth within the trough to deliver collected batter to the vessels 26. More particularly, as shown best in FIGS. 2 and 3, the paddle 30 includes a generally V-shaped lower edge which matingly fits into the trough 18. The paddle 30 is carried by a drive arm 32 forming a portion of a linear actuator 34 (FIG. 6) for displacing the paddle back and forth within the trough thereby to sweep collected batter from the opposite ends thereof. Such linear actuators are commercially available from Tolomatic Inc., of Hamel, Minn. under model designation BC 212SK86-25FM2TS2SI2. A guide rail 36 may also be provided on an overhead frame (not shown) and is received into a guide slot 38 in the paddle to track movement thereof reciprocally within the trough. A spillover or overflow port 40 is also formed in the paddle 30 to permit some batter flow through the paddle in the event that a large quantity of batter is accumulated on one side of the paddle, as viewed in FIG. 5. The spillover port 40 permits an excess portion of the collected batter to spill through the paddle and remain in the trough, without spilling over a lateral edge of the trough to fall into the fryer 16.

Figure 4:
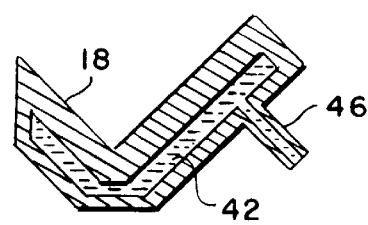
FIG. 4 is vertical sectional view taken generally on the line 4—4 of FIG. 3.
Figure 6:
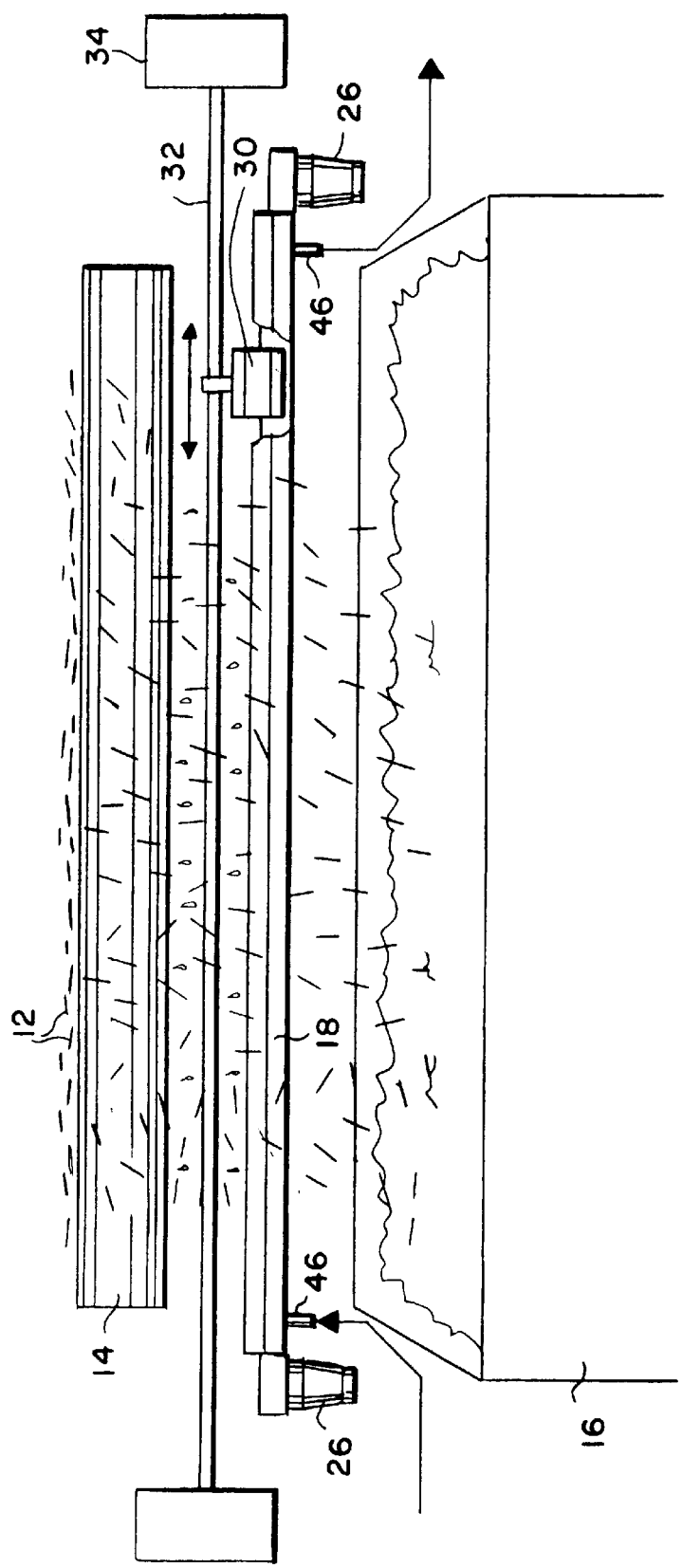
FIG. 6 is a schematic diagram of the batter reclaimer system, illustrating the downstream end thereof.

In accordance with a further aspect of the invention, the collection trough 18 is water cooled to prevent substantial cooking of the batter collected therein. As shown in FIGS. 3, 4 and 6, the trough 18 is constructed to form a hollow water jacket 42 or channel running longitudinally therethrough, with a water inlet fitting 44 and a water outlet fitting 46 at opposite ends thereof. These fittings 44, 46 are appropriately coupled to a water supply (now shown) for circulation of water through the trough 18 to cool the collected batter. In this manner, the collected batter is sufficiently isolated from the heat of the fryer 16 to prevent significant cooking thereof, so that the batter can be recycled and re-used at the batter coating station 20.

The batter reclaimer system 10 of the present invention thus collects excess batter at the downstream end of the product conveyor 14, wherein the batter would otherwise undesirably fall into the fryer 16. The collected batter is collected substantially without cooking of the batter, for recycling to the batter coating station.

A variety of modifications and improvements in and to the batter reclaimer system of the present invention will be apparent to those skilled in the art. Accordingly, no limitation on the invention is intended by way of the foregoing description and accompanying drawings, except at set forth in the appended claims.

What is claimed is:

1. A batter reclaimer system for collecting excess liquid-based batter from batter coated food products transported by a product conveyor, said batter reclaimer system comprising:

an upwardly open collection trough mounted generally at a downstream end of a product conveyor for collecting excess batter dripping from the product conveyor and from batter coated food products conveyed thereby, said collection trough having at least one open end;

at least one collection vessel mounted generally at said open end of said collection trough for receiving batter from said trough;

means for sweeping batter collected within said trough into said collection vessel; and means for cooling batter collected within said collection trough to prevent substantial cooking of the batter within said trough.

2. The batter reclaimer system of claim 1 wherein said batter sweeping means comprises a reciprocal paddle, and drive means for displacing said paddle within said collection trough.

3. The batter reclaimer system of claim 2 wherein said paddle has a spillover port formed therein.

4. The batter reclaimer system of claim 1 wherein said trough has open opposite ends, said at least one collection vessel comprising a pair of funnels at said opposite trough ends for receiving batter from said trough, and further including means for circulation of batter from said funnels to a batter coating station for re-use.

5. The batter reclaimer system of claim 1 wherein said cooling means comprises a water jacket formed in said collection trough, and means for circulating water through said water jacket to prevent substantial cooking of the batter within said trough.

6. The batter reclaimer system of claim 5 wherein the downstream end of the product conveyor is mounted to deliver the batter coated food products to a fryer.

7. The batter reclaimer system of claim 1 wherein said collection trough is mounted to extend generally transversely relative to the product conveyor at a location beneath the downstream end of the product conveyor.

8. A batter reclaimer system for collecting excess liquid-based batter from batter coated food products transported by a product conveyor, said batter reclaimer system comprising:

an upwardly open collection trough mounted generally at a downstream end of a product conveyor for collecting excess batter dripping from the product conveyor and from batter coated food products conveyed thereby, said collection trough having open opposite ends;

a pair of collection vessels mounted generally at said open opposite ends of said collection trough for receiving batter from said trough;

a reciprocal paddle mounted within said collection trough, said paddle have a central spillover port formed therein; and drive means for displacing said paddle back and forth within said collection trough to sweep batter collected within said trough into said collection vessels.

9. The batter reclaimer system of claim 8 further including means for cooling batter collected within said collection trough to prevent substantial cooking thereof.

10. The batter reclaimer system of claim 8 wherein said collection vessels comprise a pair of funnels for receiving batter from said trough, and further including means for circulation of batter from said funnels to a batter coating station for re-use.

11. The batter reclaimer system of claim 8 wherein the downstream end of the product conveyor is mounted to deliver the batter coated food products to a fryer.

12. The batter reclaimer system of claim 8 wherein said collection trough is mounted to extend generally transversely relative to the product conveyor at a location beneath the downstream end of the product conveyor.

13. A batter reclaimer system for collecting excess liquid-based batter from batter coated food products transported by a product conveyor to a cooking vessel, said batter reclaimer system comprising:

an upwardly open collection trough mounted generally at a downstream end of a product conveyor and extending transversely relative to the product conveyor for collecting excess batter dripping from the product conveyor and from batter coated food products conveyed thereby, said collection trough having open opposite ends;

a pair of collection vessels mounted generally at said open opposite ends of said collection trough for receiving batter from said trough;

a reciprocal paddle mounted within said collection trough, said paddle having a spillover port formed therein;

drive means for displacing said paddle back and forth within said collection trough to sweep batter collected within said trough into said collection vessels; and means for cooling batter collected within said collection trough to prevent substantial cooking of the batter within said trough.

14. The batter reclaimer system of claim 13 wherein said collection vessels comprise a pair of funnels for receiving batter from said trough, and further including means for circulation of batter from said funnels to a batter coating station for re-use.

15. The batter reclaimer system of claim 13 wherein said cooling means comprises a water jacket formed in said collection trough, and means for circulating water through said water jacket to prevent substantial cooking of the batter within said trough.

16. The batter reclaimer system of claim 15 wherein the cooking vessel is a fryer.

\* \* \* \* \*